US005619766A

United States Patent [19]
Zhadanov et al.

[11] Patent Number: 5,619,766
[45] Date of Patent: Apr. 15, 1997

[54] WATER DRIVEN CLEANING DEVICE

[76] Inventors: Sam Zhadanov; Eli Zhadanov, both of 2944 W 5th St., Apt. 20J, Brooklyn, N.Y. 11224

[21] Appl. No.: 601,978

[22] Filed: Feb. 15, 1996

[51] Int. Cl.⁶ ............................................. A46B 13/06
[52] U.S. Cl. ................................................ 15/29; 415/95
[58] Field of Search ................................ 15/24, 28, 29, 15/97.1, 104.92; 415/95; 239/310, 394

[56] References Cited

U.S. PATENT DOCUMENTS

| | | | |
|---|---|---|---|
| 2,678,457 | 5/1954 | Demo | 15/29 |
| 3,114,164 | 12/1963 | Riordan | 15/29 |
| 4,103,381 | 4/1978 | Schulz et al. | 15/29 |
| 4,513,466 | 4/1988 | Keddie et al. | 15/29 |
| 4,780,922 | 11/1988 | Sanchez | 15/29 |
| 4,809,382 | 3/1989 | Ravn | 15/29 |
| 5,007,127 | 4/1991 | Paolo | 15/29 |
| 5,129,121 | 7/1992 | Gelman | 15/29 |

FOREIGN PATENT DOCUMENTS

| | | | |
|---|---|---|---|
| 3138383 | 4/1993 | Germany | 15/29 |

*Primary Examiner*—Tony G. Soohoo
*Attorney, Agent, or Firm*—I. Zborovsky

[57] ABSTRACT

A water driven cleaning device has a housing having a water inlet, a water outlet and a chamber located between the water inlet and the water outlet, a cleaning tool, a rotor connected with the cleaning tool and arranged in the housing so that when water passes through the housing from the water inlet to the water outlet through the chamber the rotor is rotated by the water and therefore the cleaning tool connected with the rotor rotate as well, the rotor having a plurality of vanes which are arranged at a side facing the water outlet of the housing.

14 Claims, 7 Drawing Sheets

5,619,766

WATER DRIVEN CLEANING DEVICE

BACKGROUND OF THE INVENTION

The present invention relates to water driven cleaning devices.

More particularly, it relates to water driven cleaning devices which have a rotor with a plurality of vanes arranged in a housing so that when water passes through the housing and issues from it it drives the rotor into rotation and thereby also a cleaning tool connected with the rotor. Such devices are disclosed for example in my U.S. Pat. Nos. 4,228,558 and 4,374,444. In these patents a transmission rotation from the rotor to the cleaning tool is performed through a planetary gear transmission. It is believed that, the devices disclosed in these patents can be further improved.

SUMMARY OF THE INVENTION

Accordingly, it is an object of the present invention to provide a water driven cleaning device which is a further improvement of my patented devices.

In keeping with these objects and with others which will become apparent hereinafter, one feature of the present invention reside as, briefly stated, in a water driven cleaning devices which has a housing with a water inlet, water outlet and a rotary chamber located between the water inlet and the water outlet, with a rotor rotatable in the water chamber in direction of the water passing from the inlet to the outlet and has a plurality of vanes, wherein in accordance with the present invention the vanes are arranged in the water at a side facing toward the water outlet.

When the device is designed in accordance with the present invention, the device of the rotor arranged at the side of the water outlet, expelling of the used water is improved, the pressure at the outlet is increased, the rotary speed is increased as well and as a result, the torque is increased.

In accordance with another feature of the present invention, the axis of rotation of the rotor is located in a center of the housing, so that when the water exits axially there are no intersections of water flows and a resistance is reduced.

In accordance with still a further feature of the present invention, the rotor is arranged at the housing so that it is not in contact with any part of the housing and does not have bearings with which it is in contact. Instead, there are gaps around the rotor head with water so as to form a so-called water bearing. This eliminates heating of the rotor during its rotation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
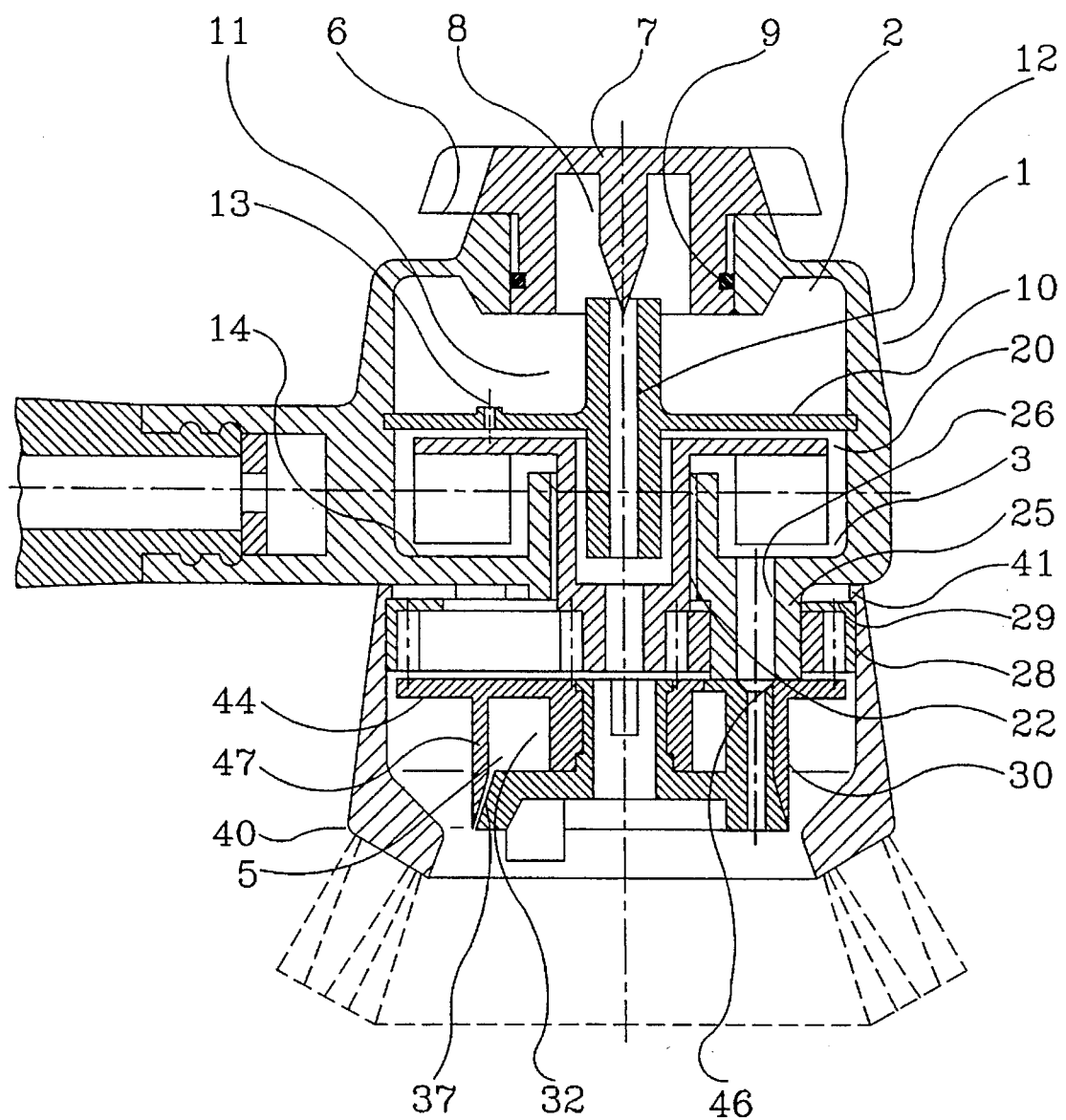
FIG. 1 is a view showing a cross-section of a water driven cleaning device in accordance with the present invention taken along an axis I—I of a rotor in FIG. 3.
Figure 2:
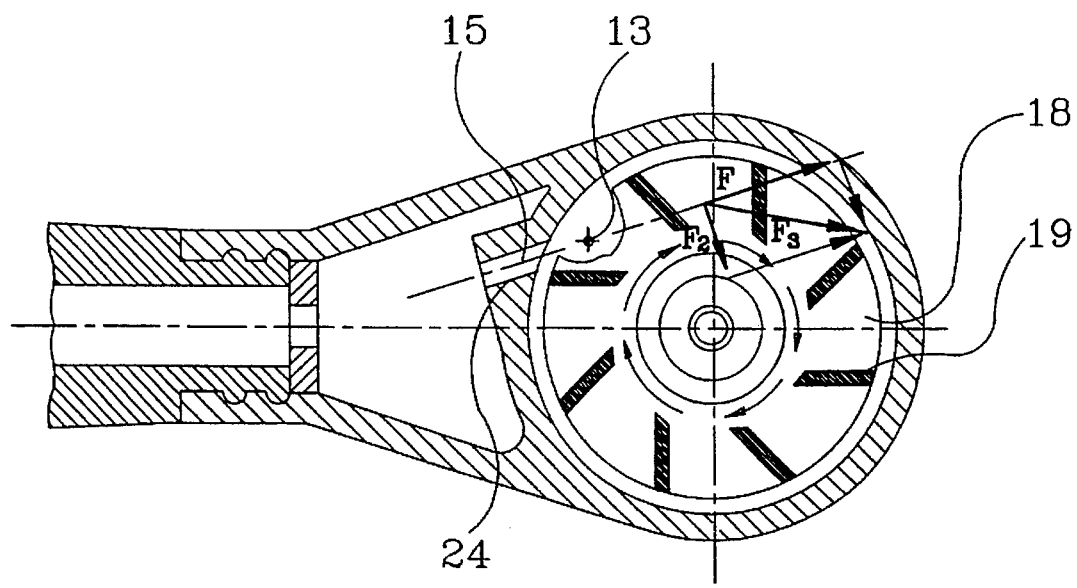
FIG. 2 is a plan view of the rotor of the inventive device located in a portion of the housing in a section II—II in FIG. 1.
Figure 4:
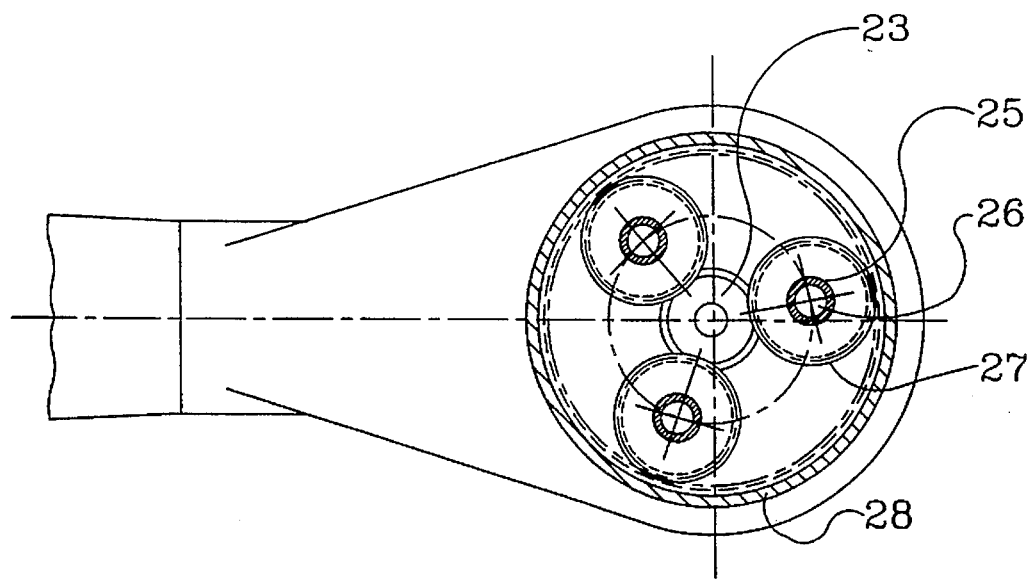
FIG. 4 is a view showing a cross-section of the planetary gear box taken along the line IV—IV in FIG. 3.

A water driven cleaning device in accordance with the present invention has a housing which is identified with reference numeral 1 in FIGS. 1 and 2 and separated by partitions into two sections 2, 3, 4, 5. The section 2 forms a chamber for stirring, preparing and dosing of a washing solution. An upper wall of the housing is provided with a threaded opening 6, and a plug 7 with an inner throttle 8 is screwed into the opening. The plug has a sealing ring 9. A partition 10 which separates the two sections of the housing has two-side tubular member 11 with an opening 12. Its upper part abuts against a conical surface of the throttle 8 when the plug 7 is completely screwed in. The partition 10 in a pressure zone is provided with a conical needle point hole 13.

The section 3 forms a rotor chamber. A rotor 18 is provided with eight open vanes 19 arranged perpendicular to a rotor disc 9 and eccentric to its axis of rotation. As can be seen from the drawings, the vanes 19 of the rotor extend downwardly from the disc in particular toward a water outlet from the housing. The rotor has a collar 22 connected with the disc 20 at the side of the vanes and provided with an end pinion 23. The side wall 24 of the housing in FIG. 2 is provided with an opening 15 which is eccentric to the axis of rotation of the rotor and has a diameter and a length selected in accordance with the laws of hydraulics to provide a bundled concentration of water flow so as to form a jet which is directed exactly onto the vanes of the rotor.

The lower wall 14 of the housing has a central hub 17 with an opening such that the rotor collar 22 extends outwardly beyond the housing and its end pinion 23 engages with three gears 27 of a planetary transmission supported on three hollow axles 25 in the housing 1. The gears 27 are engaged with an inner toothed gear 28 formed as a ring. Its outer surface 29 has a cone of two degree (Morse) and is utilized for mounting of a washing tool.

Figure 3:
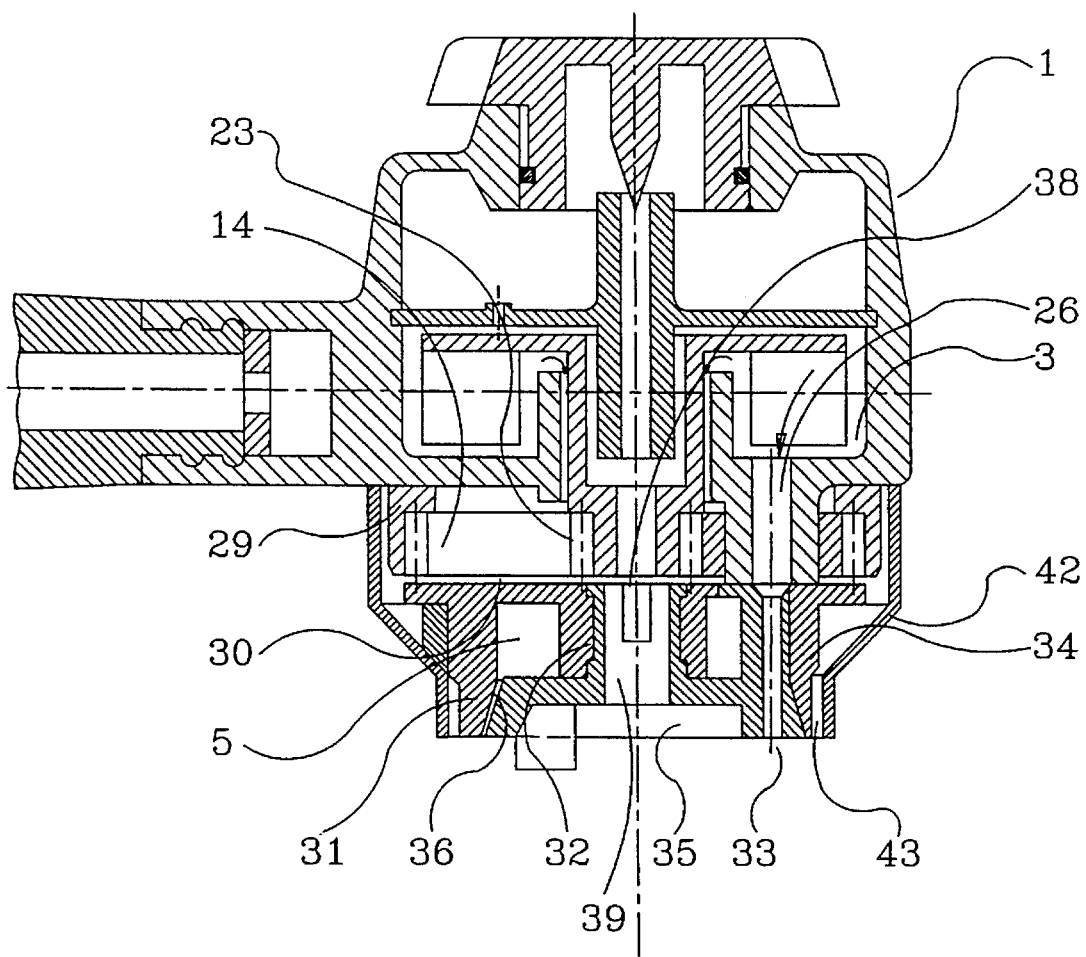
FIG. 3 is a view showing a cross-section of the inventive device with a cover cup in a section taken along the line III—III of FIG. 9.
Figure 5:
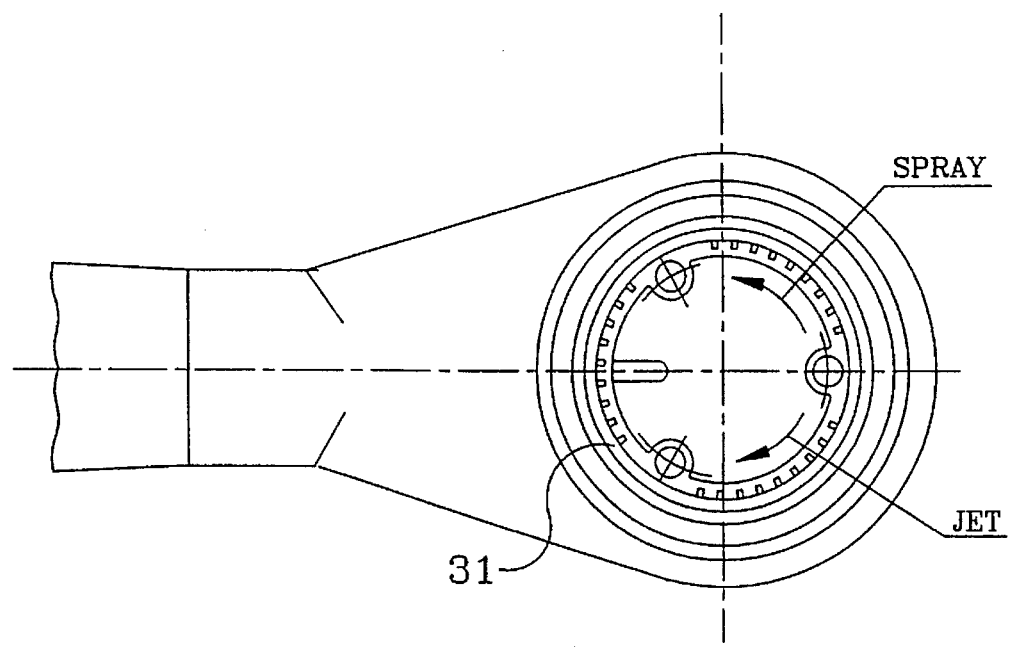
FIG. 5 is a plan view from bottom of the device in accordance with present invention with the cover cup in a jet position as seen in direction of the arrow V in FIG. 3.
Figure 6:
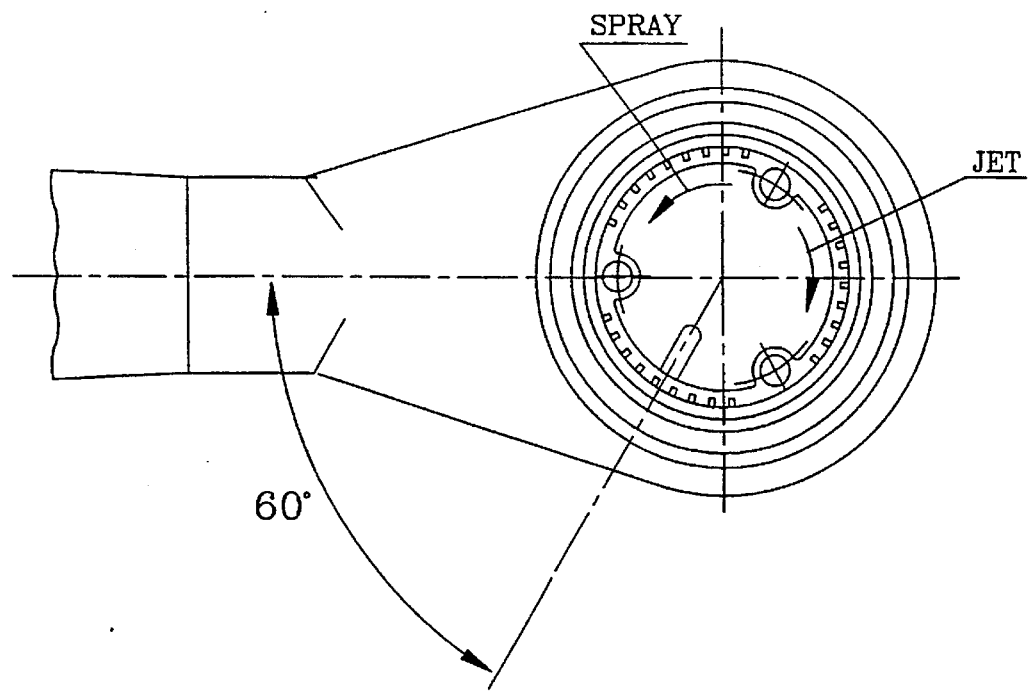
FIG. 6 is a plan view from the bottom of the inventive device with a cover cup in a spray position as seen in direction of the arrow VI in FIG. 3.
Figure 7:
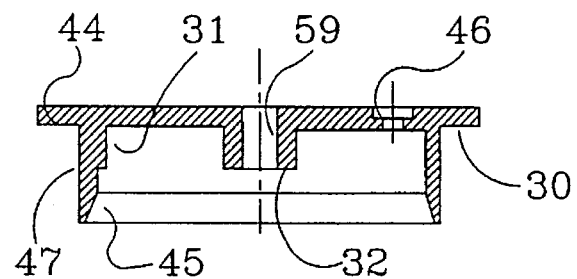
FIG. 7 is a view showing a housing of a diffuser in a section taken along line VII in FIG. 5.
Figure 8:
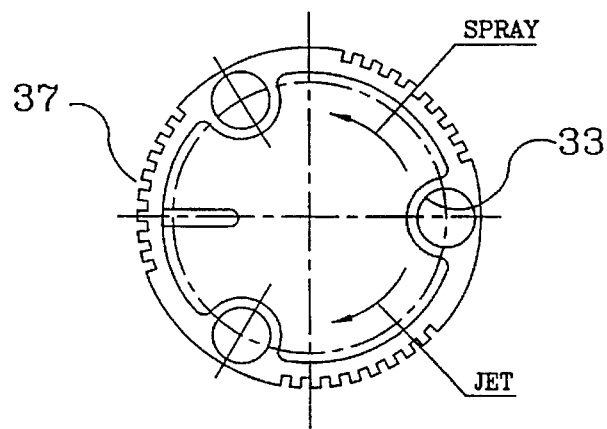
FIG. 8 is a plan view of the diffuser of the inventive device.
Figure 9:
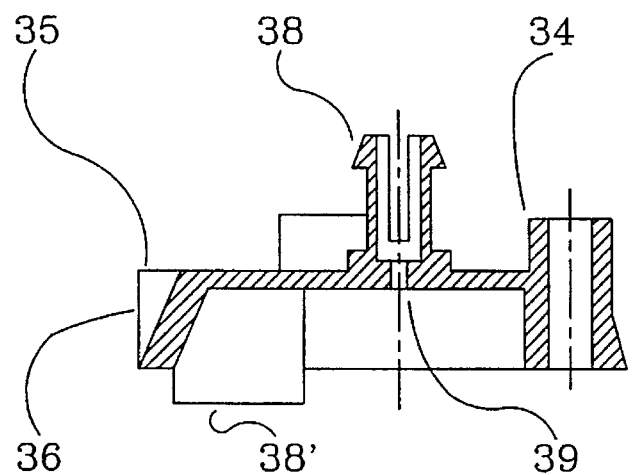
FIG. 9 is a view showing the diffuser in section taken along the line IX—IX in FIG. 8.
Figure 10:
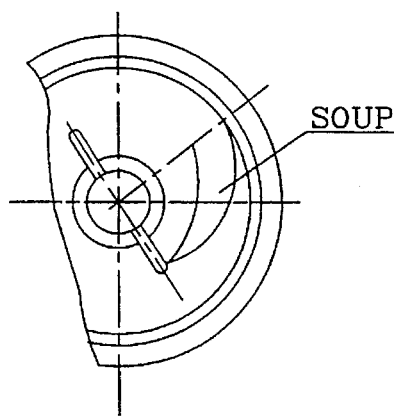
FIG. 10 is a plan view from the top of the inventive cleaner as seen in direction of the arrow X in FIG. 3.

The planetary transmission is covered by a flange 44 with a diffuser body 30 shown in FIGS. 1 and 7 mounted on axles 25 in openings 46 by ultrasound welding. The flange is provided with a hollow hub in its center having an opening 39. The circular perimeter of the flange is provided with a cylindrical ring 47 with a conical surface 45 on its inner side. A diffuser insert shown in FIGS. 3, 8, 9 has three projections 44 with openings 43 located coaxially with the openings 26 of the axles and the openings 46 of the diffuser flange. The side conical surface 36 has three sectors with conical grooves 37 which, during contact with the conical surface 45 of the diffuser body in FIG. 7 form an opening of the shower spray. The diffuser insert is connected with the diffuser body by a central split axle 38 with an opening 39, by snapping on. The diffuser can be turned from a position for providing a spray to a position for providing a jet, by a handle 38' and set by a stop 31 located on the inner surface of the diffuser body as shown in FIG. 5.

Figure 11:
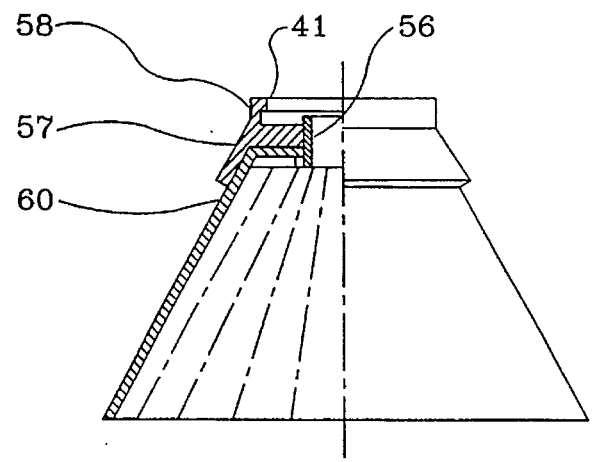
FIG. 11 is a view showing a brushless attachment in a section taken along the line XI—XI in FIG. 12.
Figure 12:
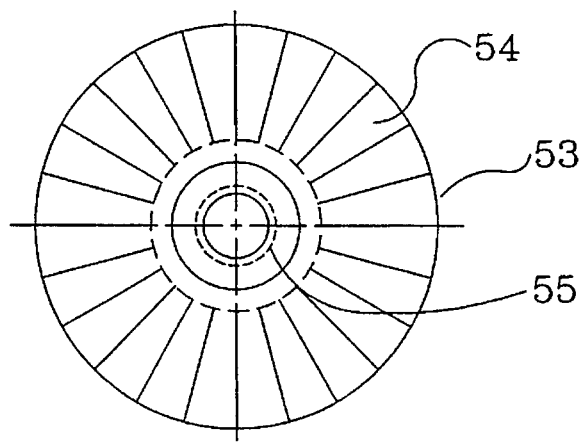
FIG. 12 is a view showing a brushless attachment as seen in direction of the arrow XII in FIG. 11.
Figure 13:
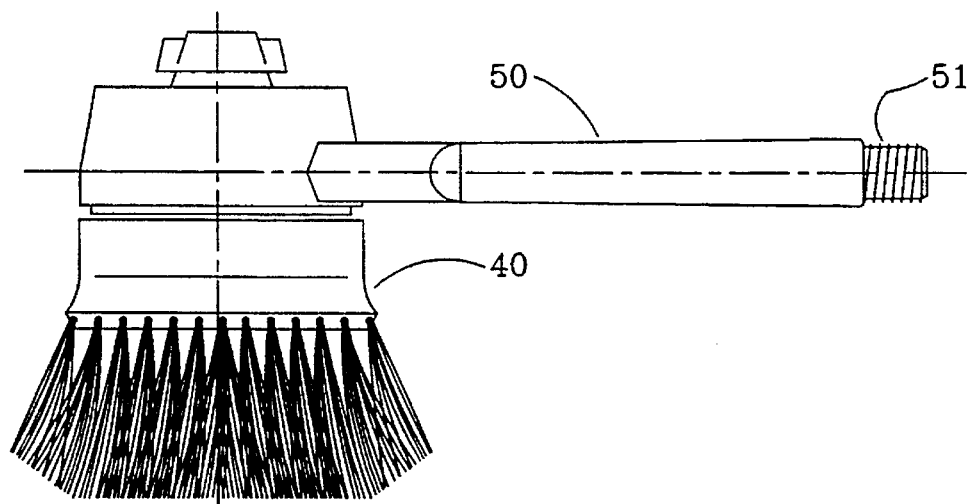
FIG. 13 is a general view of a shower cleaner with a brush of the inventive device.
Figure 14:
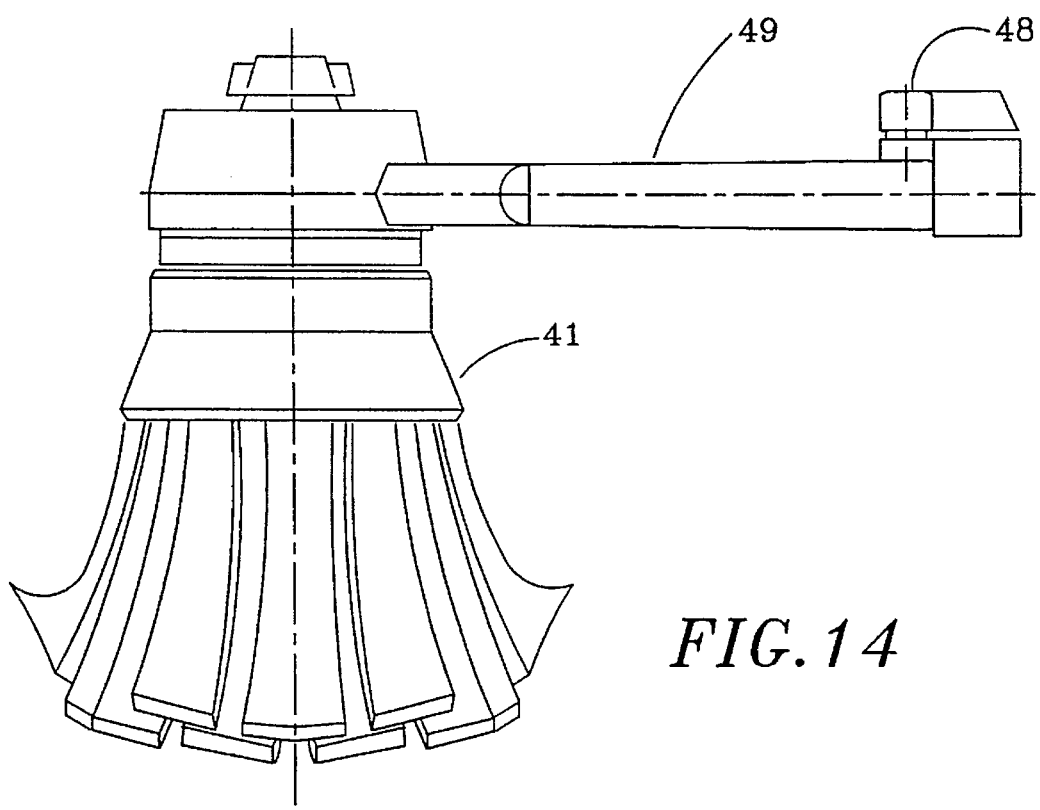
FIG. 14 is a general view of an all purpose cleaner of the inventive cleaning device with a brushless attachment.

A rotatable working tool formed as a brush 40 or a brush with attachment 41 is shown in FIGS. 1, 13, 14 and mounted on the conical surface of the planetary ring by snapping on the circular surface. It is sealed by a ring catch 41. When the device is used as an all purpose cleaner, an on/off switch 48 is provided in a handle 49 as shown in FIG. 14. A set of working tools includes the brush 40 in FIG. 13 (scrubber or all purpose brush) or a brush with attachment 41 in FIGS. 14, 11, 12 which include a disc 53 composed of felt or another material subdivided radially into strips 54 with a central opening 55. The disc is sealed between an inner ring 56 and a block 57 having a setting cone 58 and the ring catch 41. The inner surface of the block formed as a cone 60 forms an inclination of the disc strips so as to convert them into a washing tool.

When the device has to be used as a body cleaner, the handle 50 in FIG. 13 is provided with a split pipe 51 for a standard shower hose.

As can be seen from the drawings, the rotor does not contact any bearings. It is arranged in the rotor chamber with a gap so that water fills the gap so as to form a so-called water bearing. The gears of the planetary transmission are composed of a self-lubricating material and is known per se in the art and arranged on the axis of the housing so as to prevent heating of the plastic material during rotation. The gears of the planetary transmission arranged in the space between the housing 1 and the diffuser flange 44 are constantly cooled by the passing water which issues from the central hub toward the periphery.

It will be understood that each of the elements described above, or two or more together, may also find a useful application in other types of constructions differing from the types described above.

While the invention has been illustrated and described as embodied in a water driven cleaning device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A water driven cleaning device, comprising a housing having a water inlet, a water outlet and a chamber located between said water inlet and said water outlet; a rotatable cleaning tool; a rotor connected with said cleaning tool and arranged in said housing so that when water passes through said housing from said water inlet to said water outlet through said chamber said rotor is rotated by the water and therefore the cleaning tool connected with the rotor rotates as well, said rotor having a plurality of vanes which are arranged at a side facing water outlet of said housing, said rotor being arranged in said housing so that a gap is formed around said rotor and water passes through the gap to form a water bearing supporting said rotor during its rotation.

2. A water driven cleaning device as defined in claim 1, wherein said rotor has a central axis, said rotor being rotatable about a rotary axis which is located in the region of said central axis.

3. A water driven cleaning device as defined in claim 1; and further comprising a planetary transmission connecting said rotor with said cleaning tool, said planetary transmission including a planetary ring provided with a ring catch for tightening of said cleaning tool.

4. A water driven cleaning device as defined in claim 1; and further comprising a planetary gear transmission connecting said rotor with said cleaning tool, said planetary gear transmission being provided with a plurality of gear members composed of self-lubricating material.

5. A water driven cleaning device as defined in claim 4, wherein said housing has a plurality of axles for said gear members of said planetary gear transmission and formed so that gaps are formed between said axles and said gear members of said planetary gear transmision, said gaps are filled with water to form a water bearing.

6. A water driven cleaning device as defined in claim 1; and further comprising a planetary transmission arranged between said rotor and said cleaning tool and having a plurality of gear members; and a diffuser provided for issuing water as a spray or as a jet and having a flange with a central hub with water passing through said central hub and flows to a periphery to provide cooling of said gears of said planetary transmission.

7. A water driven cleaning device as defined in claim 1; and further comprising a reservoir for storing, preparing, dosing and transporting of a washing solution, said reservoir being provided with a threaded opening, a plug closing said opening and a throttle, said housing having a partition separating said chambers into one chamber portion which faces toward said reservoir and another chamber portion which contains said rotor, said partition having a conical needle point opening toward the rotor formed so that water is pressed only in one direction toward said reservoir during operation of the device.

8. A water driven cleaning device as defined in claim 7, wherein said partition has a center provided with two-sided tubular member having an upper part abutting against said throttle and a lower part supplying the washing solution into a center of said cleaning tool.

9. A water driven cleaning device as defined in claim 7, wherein said plug has a threaded portion and a sealing ring for closing a washing solution supply.

10. A water driven cleaning device, comprising a housing having a water inlet, a water outlet and a chamber located between said water inlet and said water outlet; a rotatable cleaning tool; a rotor connected with said cleaning tool and arranged in said housing so that when water passes through said housing from said water inlet to said water outlet through said chamber said rotor is rotated by the water and therefore the cleaning tool connected with the rotor rotates as well, said rotor having a plurality of vanes which are arranged at a side facing water outlet of said housing, said rotor being arranged in said housing so that a gap is formed around said rotor and water passes through the gap to form a water bearing supporting said rotor during its rotation; and a diffuser body arranged in said housing, said diffuser body being provided with grooves for a spray and openings for a jet and arranged in said housing turnably between a first position in which water issues through said grooves to form a spray and a second position in which water issues through said openings to form the jet.

11. A water driven cleaning device as defined in claim 10 and further comprising a split axle mounting said diffuser in a center of said housing and having an opening for supplying a washing solution.

12. A water driven cleaning device as defined in claim 10, wherein said diffuser has three projections with three first openings for forming a jet and three sectors with said grooves for forming the spray; and further comprising stops limiting turning of said diffuser between said positions.

13. A water driven cleaning device, comprising a housing having a water inlet, a water outlet and a chamber located between said water inlet and said water outlet; a cleaning tool rotatable; a rotor connected with said cleaning tool and arranged in said housing so that when water passes through said housing from said water inlet to said water outlet through said chamber said rotor is rotated by the water and therefore the cleaning tool connected with the rotor rotates as well, said rotor having a plurality of vanes which are arranged at a side facing water outlet of said housing, said rotor being arranged in said housing so that a gap is formed around said rotor and water passes through the gap to form a water bearing supporting said rotor during its rotation, said cleaning tool being formed as a brushless attachment including a disc subdivided radially into a plurality of strips.

14. A water driven cleaning device as defined in claim 13, wherein said disc is conical and has a conical inner surface for washing of rounded objects.

* * * * *